United States Patent [19]

Reynolds

[11] Patent Number: 5,483,847
[45] Date of Patent: Jan. 16, 1996

[54] TRANSMISSION COUNTERSHAFT ASSEMBLY

[75] Inventor: Joseph D. Reynolds, Climax, Mich.

[73] Assignee: Eaton Corporation, Cleveland, Ohio

[21] Appl. No.: 57,023

[22] Filed: May 5, 1993

[51] Int. Cl.$^6$ ....................................................... F16H 3/08
[52] U.S. Cl. ................... 74/331; 74/432; 403/356
[58] Field of Search .............................. 74/329, 331, 362, 74/366, 432, 374; 403/356, 350, 368

[56] References Cited

U.S. PATENT DOCUMENTS

| | | |
|---|---|---|
| 2,397,905 | 4/1946 | Acton et al. |
| 3,920,343 | 11/1975 | Blue et al. ................ 403/356 |
| 4,040,757 | 8/1977 | Pauli ........................ 403/356 |
| 4,104,928 | 8/1978 | Vandervoort. |

*Primary Examiner*—Rodney H. Bonck
*Assistant Examiner*—Peter Kwon
*Attorney, Agent, or Firm*—Albert E. Chrow; Howard D. Gordon

[57] ABSTRACT

A vehicular transmission is provided with an improved rotary countershaft assembly (100) that eliminates the prior art practice of securing countershaft gears (10) and (12) to adjacent sections ($S_1$) and ($S_2$) of a countershaft (2) by separate keys (14) and (22) disposed in separate grooves (16) and (19) respectively by a singular key (26) disposed in a groove (16) and whose radial thickness is adapted to enable countershaft gear (12) to rotate countershaft (2) in the absence of groove (19).

3 Claims, 1 Drawing Sheet

TRANSMISSION COUNTERSHAFT ASSEMBLY

INTRODUCTION

This invention relates generally to a vehicular transmission countershaft assembly and more particularly to a vehicular transmission having an improved countershaft assembly wherein a prior art pair of keys disposed in respective adjacent grooves to enable countershaft gears respectively engage therewith to rotate the countershaft are replaced with a singular key whose radial thickness is adapted to account for the elimination of one of the grooves its associated key.

BACKGROUND OF THE INVENTION

Vehicular transmissions of the type having at least one countershaft disposed in spaced parallel relationship to a mainshaft to provide a variety of selectable change gear ratios is well known to those skilled in the art. Most commonly the countershaft gears are either integral with or are secured to the countershaft by keys and the like for rotation therewith and the mainshaft gears encircle and are selectively clutchingly engageable for rotation with the mainshaft and have teeth that meshingly engage teeth of a countershaft gear axially aligned therewith. Sortie vehicular transmissions, known in the trade as "twin countershaft transmissions", feature a pair of countershafts in parallel spaced relationship on opposite sides of the mainshaft and have axially aligned countershaft gears whose teeth meshingly engage teeth on the mainshaft gear on opposite sides of the shaft and support the mainshaft gear such that it floats about the mainshaft until selectively clutch thereto. Varying pitch diameters of the axially aligned countershaft and mainshaft gears provide the change gear ratios associated with the particular transmission.

Due to the necessity of having to provide a variety of change gear ratios, it is not uncommon for the countershaft to have a plurality of countershaft gears of varying pitch diameter spaced axially therealong. In some cases, the countershaft gear is an integral part of the countershaft rather than being a separate gear rotated by the countershaft by means of a key or the like.

It is to the type of transmission countershafts having countershaft gears respectively secured in adjacent sections of the countershaft to which the present invention is addressed for the invention enables simplification and cost reduction associated with such countershaft assemblies by eliminating one groove and replacing the separate keys with a singular key whose radial thickness is adapted to account for the absence of the eliminated groove.

SUMMARY OF THE INVENTION

Accordingly, it is an object of this invention to provide a vehicular transmission having an improved countershaft assembly.

It is another object of this invention to provide a vehicular transmission countershaft assembly that is simplified and less costly by enabling the elimination of a groove and separate keys heretofore utilized to secure respective countershaft gears to adjacent sections of the countershaft and replacing the two keys with a singular key adapted to account for the missing groove.

DESCRIPTION OF SOME PREFERRED EMBODIMENTS

Figure 1:
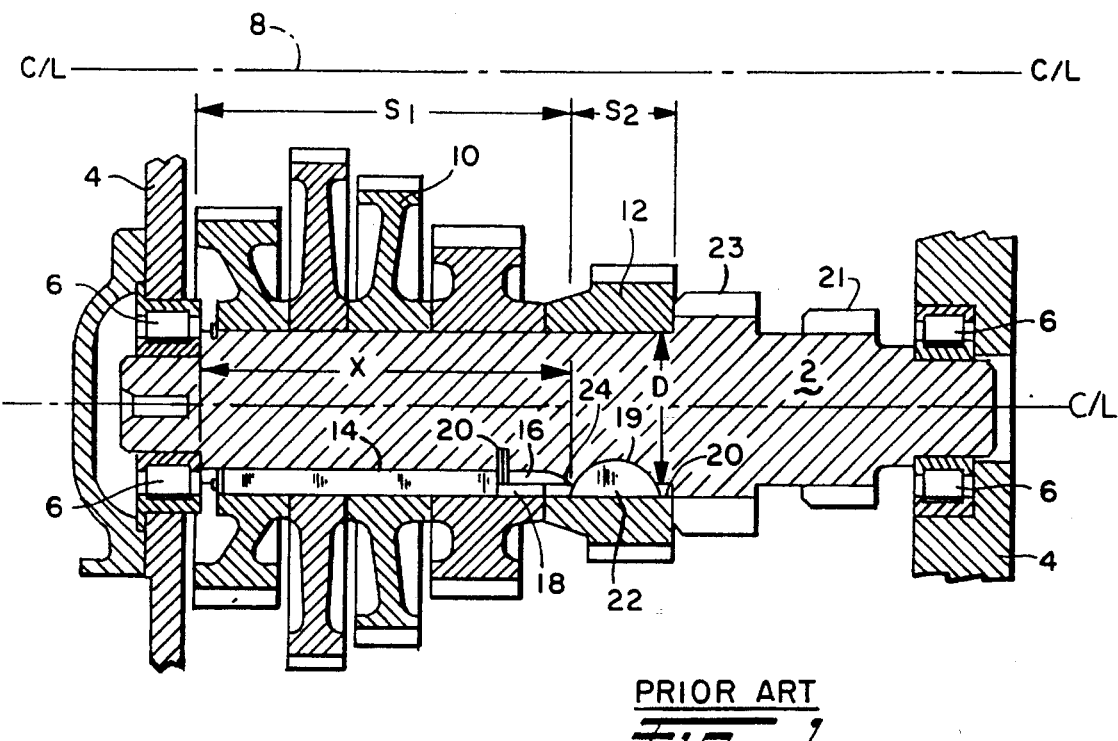
FIG. 1 is a partial side elevation view of a vehicular transmission employing a prior art type countershaft assembly.

The prior art countershaft assembly of FIG. 1 features a rotary countershaft 2 that is journaled for rotation on a transmission housing by bearings referenced by numeral 6.

The axis of rotation (C/L) of countershaft 2 is in substantial parallel relationship to the rotational axis (C/L) of the transmission mainshaft (not shown) referenced by numeral 8. As previously described, the mainshaft carries selectively clutchable gears whose teeth meshingly engage teeth of the countershaft gears according to the particular gear ratio selected.

Countershaft 2 has adjacent axially extending first and second secured sections referenced by letters "$S_1$" and "$S_2$" respectively. For purpose of this invention, the outside diameter "D" of countershaft 2 in section "$S_2$" is not less than the outside diameter of counter shaft 2 in section S, and most commonly the outside diameter of countershaft 2 is the same in both sections $S_1$ and $S_2$ as shown in FIG. 1.

A plurality of axially spaced countershaft gears (one is referenced by numeral 10) encircle countershaft 2 in section $S_1$. The countershaft gears in sections $S_1$ and $S_2$ have an opening therethrough (not referenced) that have at least one axially extending slot in the periphery about the openings such as referenced by numerals 18 arid 20 respectively.

Groove 16 in the outer surface of countershaft 2 extends axially along section $S_1$ and ends by curving radially outwardly to the intersection of sections $S_1$ and $S_2$. Groove 16 is commonly cut by a large diameter (7–9 inch) grinding wheel and the outward curvature at the end of groove 16 is the stopping point for the grinding wheel so that it does not touch integral gear 23 which in turn imparts the requirement of having to employ a "Woodruff" type key 22 hereinafter described to secure gear 12 to shaft 2.

A first key 14 is disposed in groove 16 along section $S_1$ and extends radially outwardly therefrom into grooves in the inner periphery of the section $S_1$ countershaft gears surrounding the open therethrough through which countershaft 2 is received such as referenced by numeral 18 so that they are operative to rotate countershaft 2 upon being rotated by the mainshaft gears.

Key 14 is prevented from moving axially towards section $S_2$ (rearwardly) by a pin 20 that extends radially into a suitable opening in countershaft 2 and abuts against the end of key 14 facing towards section $S_2$.

A second key 22 is disposed in an axially extending groove 19 in the outer surface of countershaft 2 in section $S_2$. As shown in FIG. 1, second key 22 is a "Woodruff" type key commonly used when the length of surface to be grooved is short. Key 22 extends radially outwardly from groove 19 into groove 20 in the periphery of countershaft gear 12 surrounding the opening through which countershaft 2 is received and is operative to enable gear 12 to rotate countershaft 2 upon being rotated by one of the mainshaft gears.

As previously described, not all countershaft gears need to be keyed to countershaft 2 such as illustrated by countershaft gears 21 and 23 that are formed integrally therewith as shown in FIG. 1.

Figure 2:
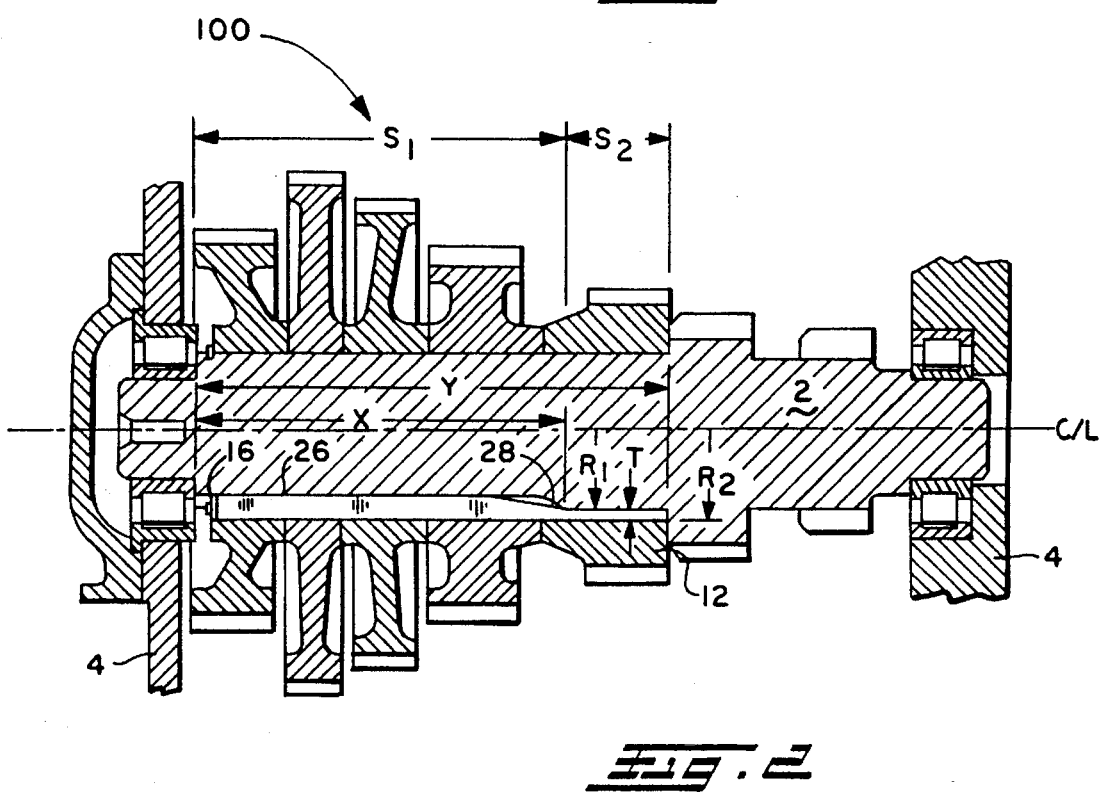
FIG. 2 is a partial side elevation view of a vehicular transmission countershaft assembly 100 made in accordance with the invention.

The improved vehicular transmission countershaft assembly of the invention is referenced by numeral 100 in FIG. 2.

Adjacent axially extending sections $S_1$ and $S_2$ are present in assembly 100 as they are in the prior art countershaft assembly of FIG. 1.

Groove 16, as previously described, extends axially along section $S_1$ for a distance "X" and ends by curving radially outwardly adjacent section $S_2$ as referenced by numeral 28. The combined length of Sections $S_1$ and $S_2$ is referenced by the letter "Y" in FIG. 2.

Note that pin 20 in FIG. 1 is absent from assembly 100 of FIG. 2 as are key 22 and groove 19 and that the combination of prior art keys 14 and 22 have been replaced with a single key 26 that extends axially along sections $S_1$ and $S_2$ for distance Y and whose radial thickness "T" in section $S_2$ is smaller than the radial thickness along section 1, by a predetermined amount.

As can be seen in FIG. 2, the radial thickness of key 26 in the region Y-X must be such that it will fit over the outer surface of countershaft 2 and within groove 20 of gear 12.

As can also be seen in FIG. 2, the use of a singular key 26 that extends along both sections $S_1$ and $S_2$ eliminates the need for pin 20 for the radial outward curvature 28 at the end of groove 16 is operative to engage and prevent key 26 from moving toward section $S_2$.

It is to be further noted that the engagement of key 26 in groove 16 is operative to enable the countershaft gears in Section $S_1$ to selectively rotate countershaft 2 as well as to carry over and enable the countershaft gears in Section $S_2$ to selectively rotate countershaft 2 as well.

What is claimed is:

1. A vehicular transmission having an improved rotary countershaft assembly, said counter shaft assembly of the type having adjacent axially extending first and second sections, said second section having a diameter that is not less than the diameter of the first section, said first section having at least one countershaft gear that is rotatably disposed about the countershaft, a first groove extending axially along the first section and radially outwardly therefrom into a groove in the inner periphery of an opening through said first section gear through which the countershaft is received, said second section having at least one countershaft gear that is rotatably disposed about the countershaft, a second groove extending axially along the second section and radially outwardly therefrom into a groove in the inner periphery of an opening through the second section gear through which the countershaft is received, wherein the improvement is characterized by said assembly including a singular key extending axially along the first and second sections, said singular key removably disposed in the first groove for rotating the first section gear and having radial thickness along the second section defined between an inner radius measured from the centerline of the countershaft that is less by a predetermined amount than the sum of one-half the diameter of the countershaft second section and an outer radius measured from the centerline of the countershaft that is larger by a predetermined amount than the sum of one-half the diameter of the countershaft second section and the depth of the groove in the inner periphery of the second section gear surrounding the opening therethrough through which the countershaft is received and operative to rotate the second section gear.

2. The transmission of claim 1 wherein the diameter of the countershaft first and second sections is substantially the same.

3. The transmission of claim 1 wherein an end of the first section groove adjacent the second section is operative to prevent the singular key from moving towards the second section.

* * * * *